(12) United States Patent
Nonoda

(10) Patent No.: US 7,810,936 B2
(45) Date of Patent: Oct. 12, 2010

(54) MICROSCOPE AND DUST TREATMENT METHOD FOR MICROSCOPE

(75) Inventor: Yukio Nonoda, Ina (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/469,033

(22) Filed: May 20, 2009

(65) Prior Publication Data

US 2009/0225421 A1 Sep. 10, 2009

Related U.S. Application Data

(63) Continuation of application No. PCT/JP2007/067045, filed on Aug. 31, 2007.

(30) Foreign Application Priority Data

Nov. 20, 2006 (JP) .............................. 2006-313394

(51) Int. Cl.
    *B60R 1/06* (2006.01)
(52) U.S. Cl. ...................... 359/508; 359/368
(58) Field of Classification Search ................ 359/507, 359/508, 509, 368
    See application file for complete search history.

(56) References Cited

U.S. PATENT DOCUMENTS 1,463,938 A 8/1923 Carter 6,210,007 B1 * 4/2001 Aikawa ...................... 359/511
2008/0087297 A1 * 4/2008 Rahbar-Dehghan ............ 134/1

FOREIGN PATENT DOCUMENTS

| JP | 7-230037 A | 8/1995 |
| JP | 8-179220 A | 7/1996 |
| JP | 09-200591 A | 7/1997 |
| JP | 11084470 * | 3/1999 |
| JP | 2003-005254 A | 1/2003 |
| JP | 2003-344904 A | 12/2003 |
| JP | 2004-287024 A | 10/2004 |
| JP | 2005-157383 A | 6/2005 |
| JP | 2006-098549 A | 4/2006 |
| JP | 2006-154463 A | 6/2006 |

OTHER PUBLICATIONS

Extended European Search Report dated Jun. 17, 2010 (in English) issued in counterpart European Application No. 07806518.2.

* cited by examiner

*Primary Examiner*—Alessandro Amari
(74) *Attorney, Agent, or Firm*—Holtz, Holtz, Goodman & Chick, PC

(57) ABSTRACT

A microscope includes an optical member; a movable member that moves so as to pass near the optical member at a time of observation operation of the microscope; and a dust removing member that is mounted on the movable member, and that exerts a function of removing dust adhered on a surface of the optical member when the movable member moves.

9 Claims, 5 Drawing Sheets

MICROSCOPE AND DUST TREATMENT METHOD FOR MICROSCOPE

CROSS-REFERENCE TO RELATED APPLICATIONS

This application is a continuation of PCT international application Ser. No. PCT/JP2007/067045 filed on Aug. 31, 2007 which designates the United States, incorporated herein by reference, and which claims the benefit of priority from Japanese Patent Applications No. 2006-313394, filed on Nov. 20, 2006, incorporated herein by reference.

BACKGROUND OF THE INVENTION

1. Field of the Invention

The present invention relates to a microscope and a dust treatment method for a microscope.

2. Description of the Related Art

Generally, microscopes, particularly, microscopes for educational use, are often used for a long term once purchased. Therefore, motes and dust enter inside from openings of a microscope over a long time, and as a result, such malfunctions as degradation of an observed image caused by dust accumulated on optical parts, or failures in operations caused by dust accumulated on a driving mechanism occur. Similarly, in microscopes for research use that are used in a research institute and the like or microscopes for inspection use that are used at a production site, specimens frequently changed. Therefore, motes and dust are likely to be accumulated therein, and similar failures occur. Furthermore, in recent years, study subjects have become increasingly minute, and microscopy using a laser has been conducted to obtain high-powered and high resolution images. Because such microscopy requires a difficult observation condition, it is severely affected by motes and dust, and therefore, extreme caution is required.

To specifically explain conventional malfunctions, a schematic side view of a conventional upright microscope is shown in FIG. 6. An incident-light-illumination optical path Xr and a transmitting-illumination optical path Xt are arranged in a main body 1, and lamp houses 11r and 11t are provided for the optical paths Xr and Xt, respectively. To the incident-light-illumination optical path Xr, an optical-path switching unit 1a that can switch among bright-field microscopy, dark-field microscopy, DIC microscopy, and the like is provided, and by pushing in and pulling out a knob 1b in a direction of front and back of a drawing sheet, the microscopy method can be switched by a not shown guide mechanism. Arranged at an upper portion of the main body 1 is a trinocular barrel 2 provided with an eye lens 3 and a TV adaptor 12 to which a TV camera 13 is attached. By pushing in and puling out, in the direction of front and back of the drawing sheet, a knob 2b of an optical-path switching unit 2a that can switch between an observation optical axis X of a binocular portion and an observation optical axis Xc of a trinocular portion, the observation optical path is switched by a not shown guide mechanism. Moreover, arranged on the observation optical path X are a revolver 5 provided with an objective lenses 6, a stage 7 that is mounted on a stage receiver 10 arranged so as to be movable in a vertical direction by rotation of a handle 1c of the main body 1, and a capacitor 9. The capacitor 9 is structured so that optical members such as a phase difference ring can be selectively arranged on the observation optical axis X by a not shown rotating mechanism. Thus, an observer 4 can observe a specimen 8 by a desired microscopy method.

However, in the main body 1, an opening 1d to which an illumination filter is inserted, an FS adjusting hole 1e, and an AS adjusting hole 1f are present, and exterior motes and dust enter the inside of the main body 1. Entered dust scatters in various directions as shown by arrows D1 to D6, to adhere to various optical parts such as an objective lens, and a driving mechanism such as the optical-path switching unit 1a. In addition, optical path switching by the optical-path switching unit 1a causes wear of metal and resin of the not shown guide mechanism. Accordingly, metal powder and resin powder fall in a direction of the objective lenses 6 as indicated by an arrow D7. Furthermore, when the stage receiver 10 is moved in a vertical direction by way of a rack-and-pinion mechanism by rotation of a handle 1c, metal powder or resin powder falls as indicated by an arrow D8.

Similarly, in the trinocular barrel 2, powder due to wear caused by switching performed by the optical-path switching unit 2a falls on an imaging lens as indicated by an arrow D9. Also inside the capacitor 9, powder due to wear occurs and adheres to optical parts, although not illustrated. Entrance of exterior dust can be prevented to some extent by closing openings. However, it is difficult to completely shut portions to which the user puts in an optical part.

For malfunctions due to dirt on an optical part, a structure capable of easily cleaning a dust filter has been proposed (for example, Japanese Patent Laid-Open Publication No. H8-179220). A technique disclosed in Japanese Patent Laid-Open Publication No. H8-179220 facilitates cleaning work by newly arranging a dust filter for cleaning because cleaning of a dust filter arranged near a CCD is difficult.

For malfunctions due to dirt on a driving mechanism, there has been a proposal in which a mechanism section of a stage is arranged under a stage floor to avoid adverse effects of dust on the stage (for example, Japanese Patent Laid-Open Publication No. 2005-157383).

However, in the one disclosed in Japanese Patent Laid-Open Publication No. H8-179220, although cleaning work is facilitated, complicated disassembling work is still required. In addition, even such work is still required, parts that are not essential for the function such as a dust filter, a tube for attachment and detachment, and a holding ring are required, and, as a result, cost increases. Therefore, it cannot be regarded as an enough improvement.

Furthermore, in the one disclosed in Japanese Patent Laid-Open Publication No. 2005-157383, measures against dust that falls from the mechanism section of the stage is not considered, and adhesion of dust on a focusing mechanism or a capacitor arranged at a lower portion of the stage cannot be avoided. Therefore, complicated cleaning is required for such mechanism and the like.

SUMMARY OF THE INVENTION

A microscope according to an aspect of the present invention includes an optical member; a movable member that moves so as to pass near the optical member at a time of observation operation of the microscope; and a dust removing member that is mounted on the movable member, and that exerts a function of removing dust adhered on a surface of the optical member when the movable member moves.

A dust treatment method for a microscope according to another aspect of the present invention includes mounting a dust removing member on a movable member that moves so as to pass near an optical member at a time of observation operation of the microscope; and removing dust adhered on a surface of the optical member by the dust removing member mounted on the movable member when the movable member moves.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained with reference to the accompanying drawings.

First Embodiment

Figure 1:
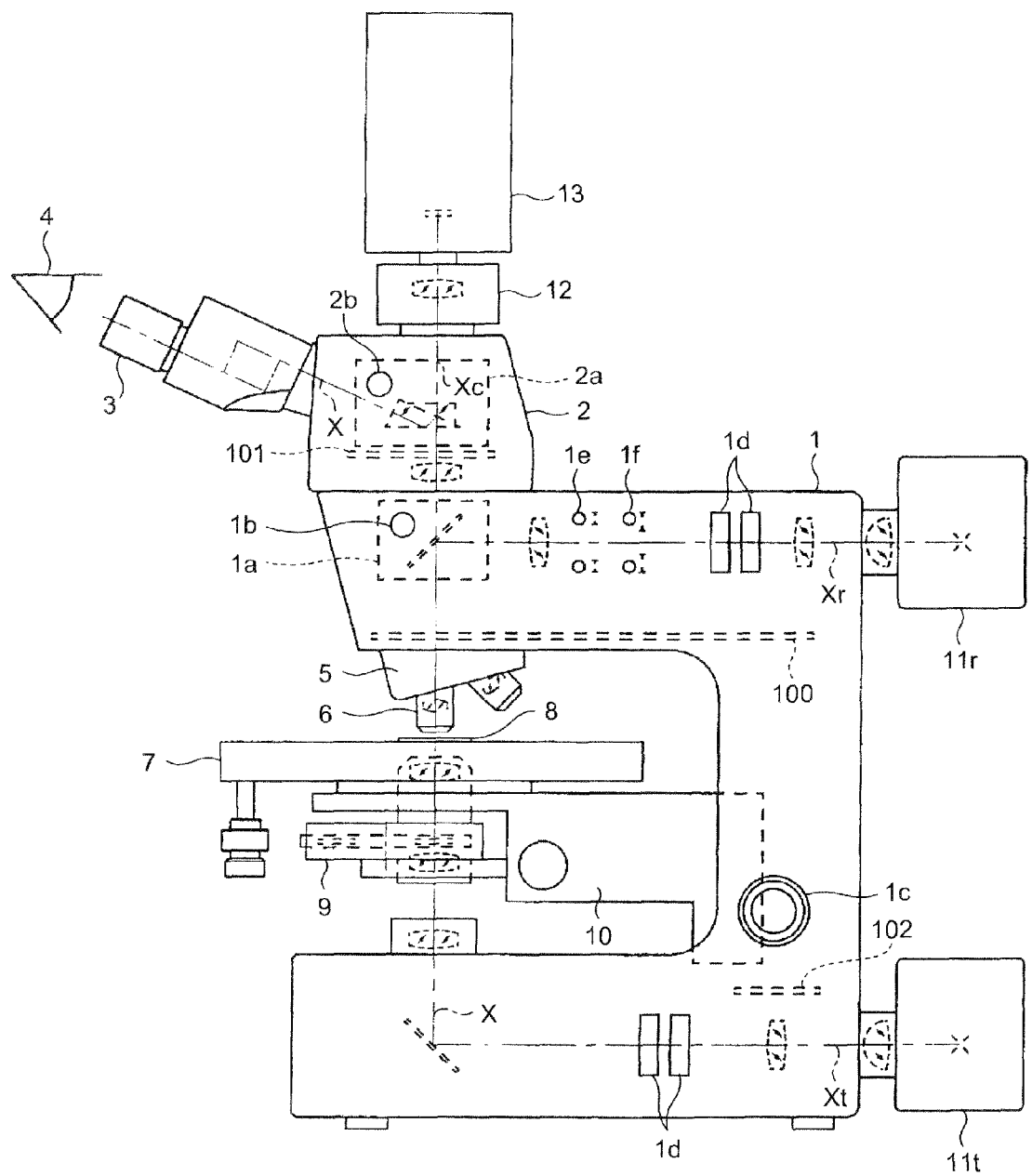
FIG. 1 is a schematic side view showing a constitutional example of a microscope according to a first embodiment of the present invention.

A first embodiment of the present invention is explained based on FIG. 1. FIG. 1 is a schematic side view showing a constitutional example of a microscope according to the first embodiment of the present invention. The same parts are denoted by the same reference numerals as in FIG. 6, and explanation therefor is omitted. In an upright microscope of the present embodiment, an adhesion sheet 100 to which adhesive is applied on a surface thereof to serve as a catching member is arranged in a space under the incident-light-illumination optical path Xr in the main body 1 being the scattering paths of dust and the like (microparticles) indicated by the arrows D1 to D4 and D7 in FIG. 6. Furthermore, a adhesion sheet 101 to which adhesive is applied on a surface thereof to serve as a catching member is arranged in a space under the optical-path switching unit 2a in the trinocular barrel 2 being the scattering path of powder from wear (microparticles) indicated by the arrow D9 in FIG. 6. Moreover, a magnet sheet 102 to serve as a catching member is arranged in a space under the handle 1c being the scattering path of wear powder due to wear (microparticles) indicated by the arrow D8 in FIG. 6.

As described, by arranging the adhesion sheet 100 on the scattering paths of dust entering inside through the opening 1d for the incident-light-illumination optical path Xr and the scattering paths of powder due to wear that is generated inside by the optical-path switching unit 1a, dust entering inside through the opening 1d and powder due to wear generated by the optical-path switching unit 1a fall on the adhesive on the surface of the adhesion sheet 100 to be caught thereon. Thus, the scattering of the dust inside the microscope can be suppressed. Similarly, by arranging the adhesion sheet 101 on the scattering paths of powder due to wear generated by the optical-path switching unit 2a, powder due to wear that is generated by the switching performed by the optical-path switching unit 2a falls on the adhesive on the surface of the adhesion sheet 101 to be caught thereon. Thus, it is possible to prevent the powder from falling on the imaging lens. Furthermore, by arranging the magnet sheet 102 in the scattering path of metal powder and the like generated by rotation of the handle 1c, metal powder such as iron powder generated by rotation of the handle 1c falls on the surface of the magnet sheet 102 to be caught thereon by the effect of the magnetic attraction. Thus, the scattering of the powder inside the microscope can be suppressed.

As described, according to the microscope and the dust treatment method for a microscope according to the present embodiment, by arranging the adhesion sheets 100 and 101, and the magnet sheet 102 on the scattering paths of microparticles such as dust and powder due to wear, microparticles such as dust entering through the opening 1d of the microscope and powder due to wear and the like generated inside fall on the surface of the adhesion sheets 100 and 101 or the magnet sheet 102 and are caught and stay thereon by the adhesion effect, so that such microparticles do not scatter inside the microscope. Therefore, it is possible to prevent adhesion of dust and powder due to wear to internal parts such as various optical parts and a driving mechanism. Accordingly, an inexpensive microscope can be provided for which no complicated cleaning work is required and maintenance of the internal parts of the microscope is not necessary for a long term.

Positions of the catching members such as the adhesion sheets 100 and 101, and the magnet sheet 102 are not limited to the positions shown in FIG. 1, and can be any position as long as it is on a scattering path in which microparticles such as dust and powder due to wear may scatter. Moreover, although the adhesion sheets 100 and 101, and the magnet sheet 102 are used as an example of the catching members, it is not limited thereto. For example, a plastic sheet that is likely to be statically charged can be used to catch dust by electrostatically adsorbing dust. Alternatively, soft rubber can be used. In other words, any material can be used as long as the material exerts adhesion effect. Furthermore, the method of catching microparticles is not limited to adhesion. For example, a sheet having minute projections and depressions on a surface thereof has the effect of catching the dust and stopping scattering, and therefore, it is possible to use such a sheet having the catching function due to a texture thereof to prevent the scattering. Moreover, if exchange of sheets is necessary depending on an installment position of the catching member, an attaching/detaching portion assuming the exchange is provided to make it attachable and detachable, to exchange sheets regularly every predetermine period. Thus, it becomes possible to use the microscope in more comfortable condition. Furthermore, the catching member is not limited to a sheet-formed member, and for example, a member having the effect of preventing the scattering by catching microparticles by the adhesion effect and the like can be a part of an internal part constituting the microscope. Thus, it is not required to arrange an additional part. Particularly, a magnetized iron ware can be used as a substitute for the magnet sheet 102.

Second Embodiment

Figure 2:
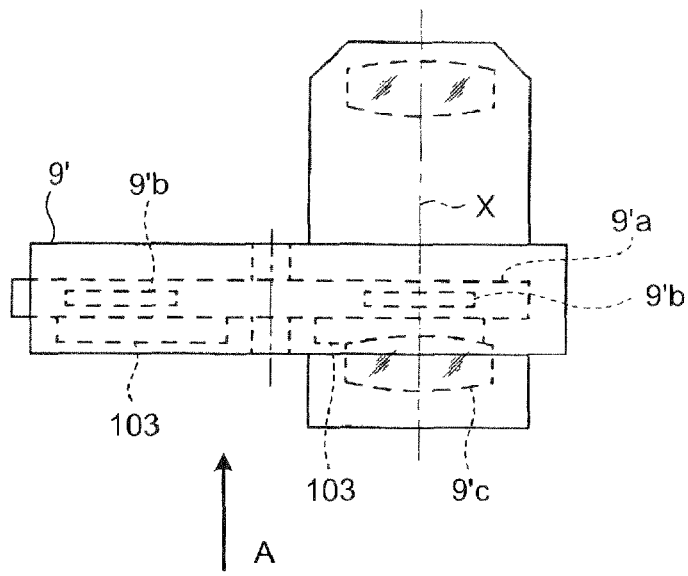
FIG. 2 is a schematic side view showing a constitutional example of a capacitor in a microscope according to a second embodiment of the present invention.
Figure 3:
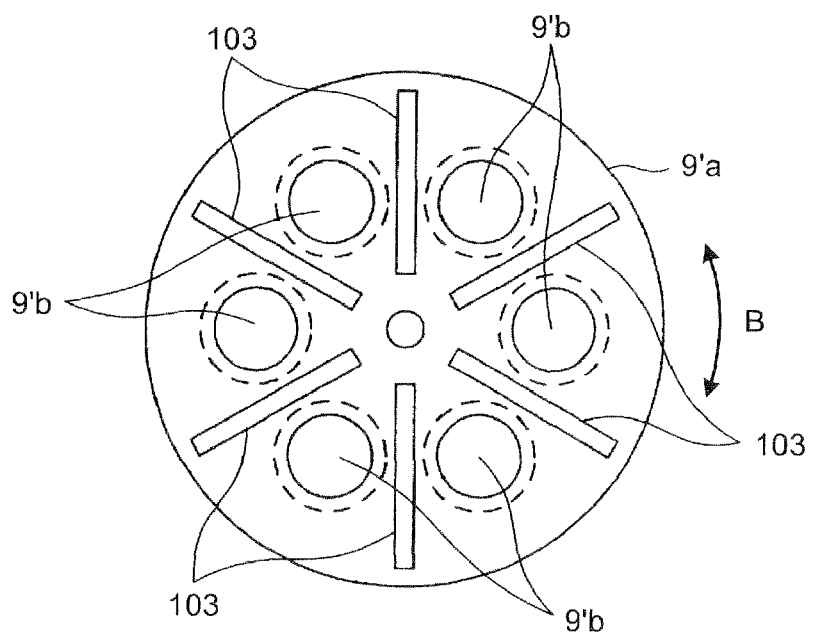
FIG. 3 is a bottom view of a capacitor turret viewed in a direction of an arrow A shown in FIG. 2.

A second embodiment of the present invention is explained based on FIG. 2 and FIG. 3. FIG. 2 is a schematic side view showing a constitutional example of a capacitor in a microscope according to the second embodiment, and FIG. 3 is a bottom view of a capacitor turret viewed in a direction of an arrow A in FIG. 2.

Figure 6:
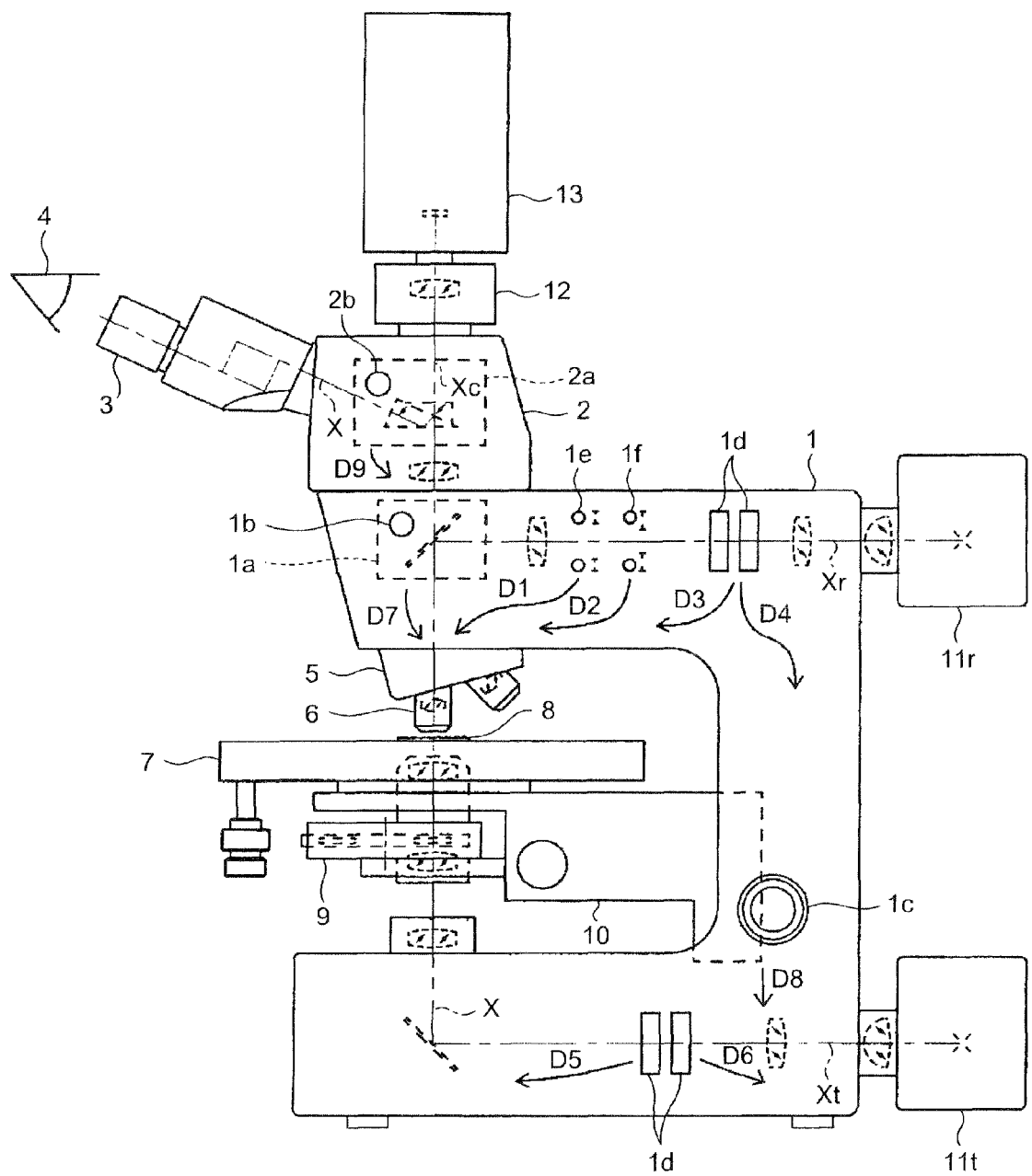
FIG. 6 is a schematic side view showing a constituently example of a conventional upright microscope.

A capacitor 9' of the second embodiment is a modification of capacitor 9 shown in FIG. 6. In the capacitor 9' of the second embodiment, a turret 9'a that enables insertion of a plurality of optical members 9'b such as a phase ring into the observation optical axis X appropriately to the objective lens 6 to be used is arranged in a rotatable manner, and is positioned by a not shown click mechanism. That is, the turret 9'a is a member that can move so as to pass near a lens 9'c being an optical member arranged on the observation optical axis X at the time of observing operation of the microscope. At a bottom surface of this turret 9'a, a plurality of brushes 103 being a dust removing member are attached radially at such positions that optical paths of the optical members 9'b are not disturbed. The brush 103 has at least length equal to or longer than a diameter of the lens 9'c, and it is set to have such height that the brush 103 passes the lens 9'c in slight contact with an upper surface of the lens 9'c when a user rotates the turret 9'a in a direction indicated by an arrow B in FIG. 3 at the time of observation operation of the microscope. The brush 103 is formed with such a soft material that the surface of the lens 9'c is not scratched even if the brush 103 touches the surface, for example, with a bird feather.

With such a configuration, when a user rotates the turret 9'a as a regular operation to be performed at the time of observation operation of the microscope, the brushes 103 attached on the bottom surface of the turret 9'a pass the lens 9'c so as to move over the upper surface of the lens 9'c in slight contact therewith, thereby exerting a function of removing dust that is adhered on the upper surface of the lenses 9'c. Thus, the dust is forcibly removed.

As described, according to the second embodiment, the surface of the lens 9'c is regularly cleaned corresponding to the regular operation performed by the user at the time observation operation of the microscope, to be maintained in a condition in which dust and powder due to wear are not adhered. Therefore, an inexpensive microscope can be provided for which no complicated cleaning work is required and maintenance of internal parts of the microscope is not necessary for a long term.

In the second embodiment, explanation has been given with an example in which the brushes 103 being a dust removing member are arranged on the movable turret 9'a assuming the lens 9'c in the capacitor 9' is a cleaning target. However, it is not limited to a capacitor, and the dust removing member can be arranged in any part as long as the part can be moved by an operation that is performed regularly by a user at the time the observation operation of the microscope, as an optical-path switching mechanism of a lens barrel or a lighting tube, and an up and down mechanism of a focusing unit, for example. If exchange of brushes is necessary, it is configured such that the brushes 103 are detachable assuming the exchange. Accordingly, a dust removing function can be exerted for a long term by regularly exchanging the brushes. Moreover, the dust removing member is not necessarily be configured to touch, as the brushes 103, the surface of an optical member being the target such as the lens 9'c. For example, a plastic sheet that is likely to be statistically charged can be used to exert the dust removing function by making dust on the surface of the lens 9'c adsorb thereon by the static electricity of the plastic sheet without touching the surface of the lens 9'c at the time of passing near the lens 9'c corresponding to the rotation operation of the turret 9'a.

Third Embodiment

Figure 4:
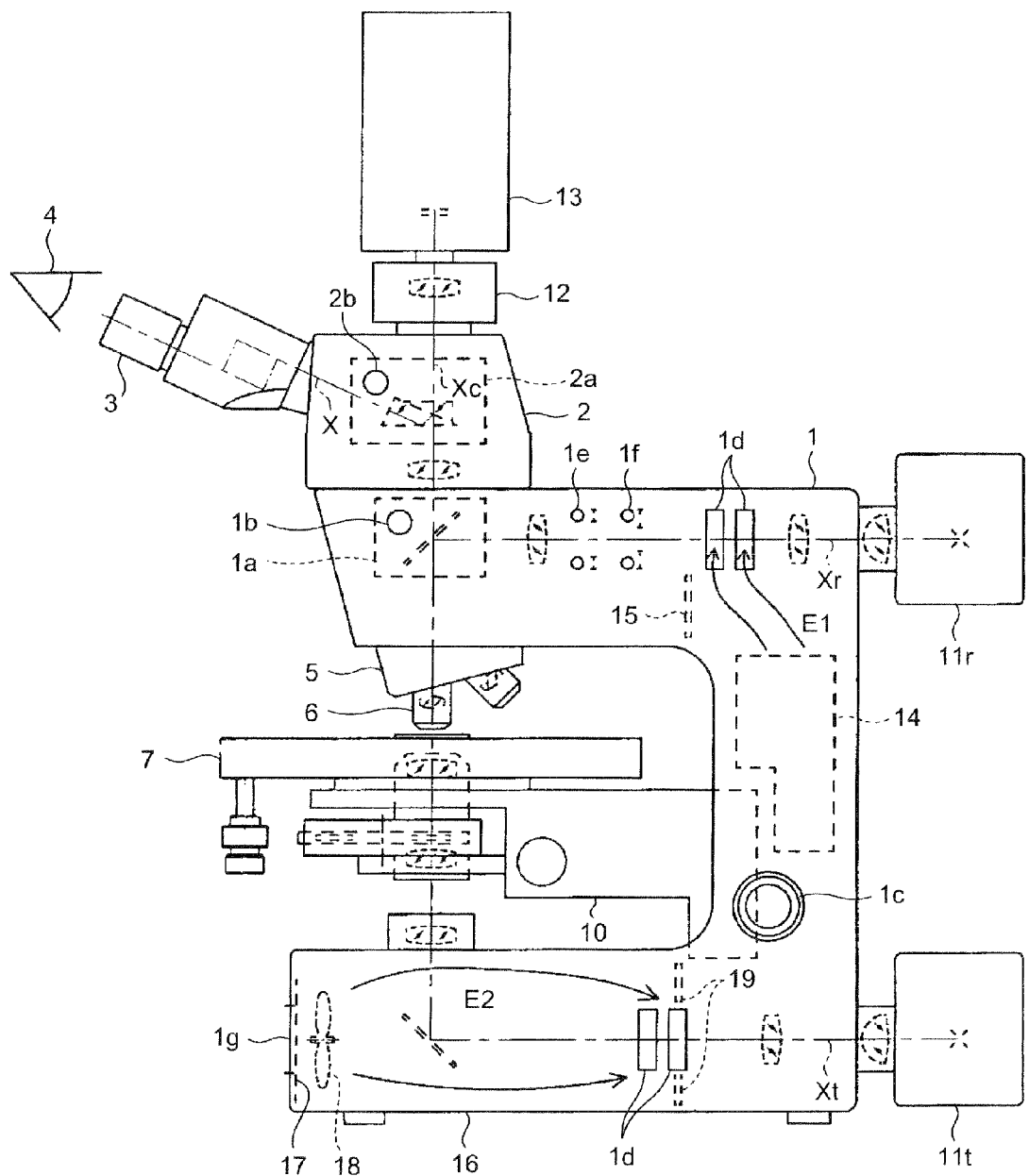
FIG. 4 is a schematic side view showing a constitutional example of a microscope according to a third embodiment of the present invention.

A third embodiment of the present invention is explained based on FIG. 4. FIG. 4 is a schematic side view showing a constitutional example of a microscope according to the third embodiment of the present invention. The same parts are denoted by the same reference numerals as in FIG. 6, and explanation therefor is omitted. In an upright microscope of the present embodiment, a main power source 14 that is used to turn on a lamp and the like is provided as an airflow generating source, and a mechanism that generates an airflow inside the microscope is arranged in the main body 1 at a lower side position of the opening 1d at an upper position for the incident-light-illumination optical path Xr. Between the main power source 14 and the opening 1d at the upper portion, a partition 15 to form a flow path so that the air flows from the main power source 14 to the opening 1d as indicated by an arrow E1 is provided. Moreover, at a front part (front of the microscope) of a base 16 constituting the transmitting-illumination optical path Xt of the main body 1, an opening 1g is formed, and a filter 17 to prevent entrance of dust through the opening 1g is arranged on an internal side of this opening 1g. Behind the filter 17 (internal side of the main body 1), a fan 18 as an airflow generating source that is rotated by a not shown motor to generate wind is provided, and a mechanism of generating an airflow inside the microscope is arranged. The fan 18 rotates in synchronization with a power source of the microscope. On and off of the rotation can also be arbitrarily set by a user. Furthermore, a partition 19 is provided near the opening 1d at a lower position, and a flow path of air that flows from the fan 18 to the opening 1d indicated by an arrow E2 is formed between the fan 18 and the opening 1d.

When the power of the microscope is turned on in such a configuration, the main power source 14 generates heat. The generated heat warms up ambient air and the air flows upward as a thermal airflow. At this time, the partition 15 arranged near the opening 1d at the upper position controls the flow of the thermal airflow to form a flow path toward the opening 1d. Therefore, the airflow flows outside of the microscope from the main power source 14 through the opening 1d as indicated by the arrow E1. On the other hand, on a side of the base 16, clean air without dust is taken inside the base 16 through the opening 1g and the filter 17 when the fan 18 rotates. At this time, the partition 19 arranged near the opening 1d on the side of the base 16 controls the flow of the airflow to form a flow path toward the opening 1d. Therefore, the air flows outside the microscope from the fan 18 through the opening 1d as indicated by the arrow E2.

As described, by forming flow paths to the openings 1d from the main power source 14 and the fan 18 as an airflow generating source, entrance of dust through the openings 1d to the inside of the microscope can be prevented. As a result, the inside of the microscope is always maintained clean, and entrance or adhesion of dust to internal parts such as optical parts and a driving mechanism can be prevented. Accordingly, no cleaning of dust from outside is required. Therefore, an inexpensive microscope can be provided for which no complicated cleaning work is required and maintenance of the internal parts of the microscope is not necessary for a long term. Particularly, by such a measure of using thermal airflow that is generated by the main power source 14 as in the third embodiment, it is only necessary to conduct a flow path design considering the airflow and arrange the partition 15, and a no special mechanism is required. Therefore, the microscope can be constituted at low cost.

In the third embodiment, the main power source 14 which is a heat source is used as an airflow generating source. However, it is not limited thereto. For example, a heat source of a lamp house 11r, or a heat source of a motor in an electrical driving mechanism can be used. It is essential only that a heat source can generate a thermal airflow. Furthermore, an opening for which a flow path is formed is not limited to the opening 1d at the upper position, and it can be applied to any opening of the microscope such as the FS adjusting hole 1e and the AS adjusting hole 1f. Moreover, it is not necessary to provide the fan 18 specially for generating an airflow. For example, if airflow generated by a cooling fan of a CCD and the like, or airflow generated by a driving mechanism, such as airflow generated by a rotating mechanism of the turret and airflow generated when the focusing mechanism moves up and down, is used, the microscope can be constructed at even lower cost.

Fourth Embodiment

Figure 5:
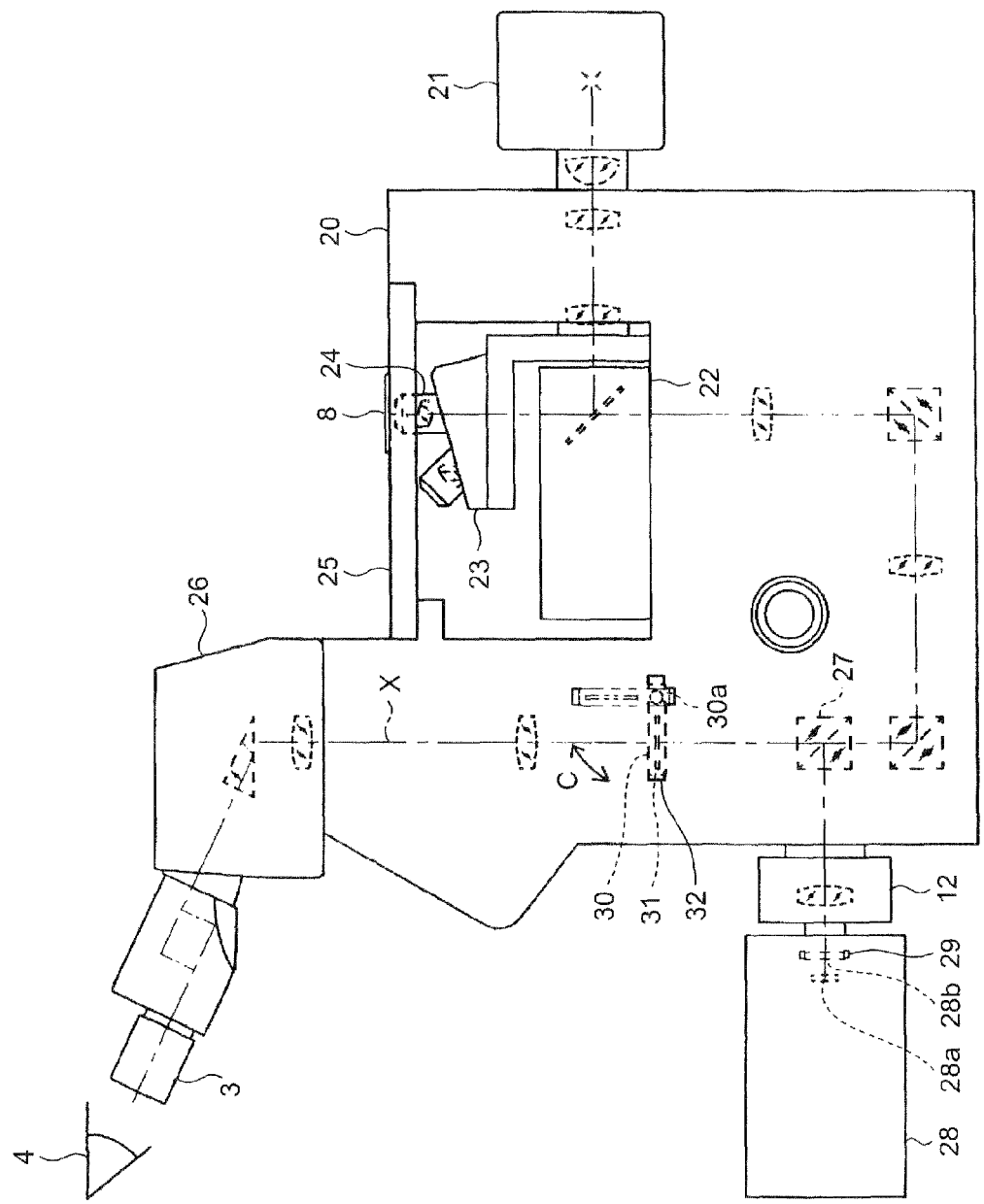
FIG. 5 is a schematic side view showing a constitutional example of a microscope according to a fourth embodiment of the present invention.

A fourth embodiment of the present invention is explained based on FIG. 5. FIG. 5 is a schematic side view showing a constitutional example of a microscope according to the fourth embodiment of the present invention. The same parts are denoted by the same reference numerals as in FIG. 6, and explanation therefor is omitted.

For the microscope according to the present embodiment, an example of application of an upright microscope is given. In a main body 20, a lamp house 21 for an incident-light-illumination is provided, and on an illumination optical axis thereof, a cube turret 22 having a desirable optical member housed therein is arranged. The cube turret 22 reflects an illumination optical axis to an observation optical axis X of an objective lens 24 that is mounted on a revolver 23 in a focusing mechanism of the main body 20. Moreover, on an upper surface of the main body 20, a stage 25 and a lens barrel 26 provided with the eye lens 3 are arranged. The lens barrel 26 is positioned on the observation optical axis X. The observation optical axis X of the main body 20 is branched for TV observation by a branching prism 27, and on a branched optical axis for TV observation, a TV adaptor 12 and a TV camera 28 are arranged. In this TV camera 28, a light receiving element 28a such as a CCD and a filter 28b as an optical member are arranged on the branched optical axis for TV observation. The filter 28b is a dust filter to prevent adhesion of motes and dust to the light receiving element 28a, and is mounted airtightly to the outside. Furthermore, an ultrasonic oscillator 29 is mounted to an outer periphery of the filter 28b so as not to affect the optical path. This ultrasonic oscillator 29 is set to generate ultrasonic oscillation of approximately 30,000 times/second for a predetermined time period when the power of the microscope is turned on.

Furthermore, on the observation optical axis X, a reticle 31 for a photo frame being an optical member that is fixed on a reticle holder 30 is arranged. This reticle 31 can be moved on and off with respect to the observation optical axis X by 90 degree rotation indicated by an arrow C about a reticle-holder rotation axis 30a as an axis, by an operation of turning a not shown turn knob performed by a user. To the reticle holder 30, which is a member holding the reticle 31, an ultrasonic oscillator 32 is mounted so as not to affect an optical axis of the reticle 31. This ultrasonic oscillator 32 is set to generate ultrasonic oscillation of approximately 30,000 times/second for a predetermined time period when the reticle holder 30 is positioned vertically away from the observation optical axis X, as a result of 90 degree rotation made by an operation of turning the turn knob performed by the user as indicated by a virtual line in FIG. 5.

In such a configuration, because the ultrasonic oscillator 29 generates ultrasonic oscillation of approximately 30,000 times/second for a predetermined time period every time the power of the microscope is turned on, dust adhered on the filter 28b is forcibly and instantaneously shaken off and falls down. Furthermore, because the ultrasonic oscillator 32 generates ultrasonic oscillation of approximately 30,000 times/second for a predetermined time period every time the user turns the turn knob at an arbitrary timing to retract the reticle holder 30 away from the observation axis X, dust adhered on a surface of the reticle 31 is forcibly and instantaneously shaken off and falls down.

As described, according to the fourth embodiment, by causing the ultrasonic oscillators 29 and 32 to generate oscillation for a predetermined time period at the time of turning on the power or of operation performed at arbitrary timing by a user, dust and the like adhered on the filter 28b and the reticle 31 are forcibly and instantaneously shaken off to be removed. Therefore, the filter 28b and the surface of the reticle 31 can be maintained in a state without adhesion of dust and the like. Accordingly, an inexpensive microscope can be provided for which no complicated cleaning work is required and maintenance of the internal parts of the microscope is not necessary for a long term. Particularly, for a part, such as the filter 28b inside the TV camera 28, at which extremely minute dust can cause a problem, generally, physical cleaning is difficult. However, by applying the fourth embodiment of the present invention, daily cleaning is enabled just by turning on the power or by operating the turn knob by a user, and thus, complicated cleaning work is eliminated.

An optical member or a holding member therefor to which an ultrasonic oscillator is mounted is not limited to the ones explained in the fourth embodiment. For example, it can be applied to various dust-proof glasses and optical members in the microscope. Particularly, because dust is directly seen on a portion on which a real image, which is directly seen by a user at the observation, is projected, for example, on an FS and a lens surface close thereto, if the ultrasonic oscillator is arranged at such a portion, great effect is expected.

Furthermore, in the fourth embodiment, the ultrasonic oscillator 32 is caused to generate the ultrasonic oscillation in a state (retracted state) in which the reticle 31 being an optical member is arranged such that a longitudinal direction thereof is parallel to a direction of gravitational force. However, the arrangement thereof is not limited to parallel to the direction of gravitational force, and the ultrasonic oscillator 32 can be operated in a state in which the ultrasonic oscillator 32 is inclined relative to the direction of gravitational force. Moreover, although the ultrasonic oscillation of the ultrasonic oscillators 29 and 32 are approximately 30,000 times/second, the oscillation can be changed to an appropriate oscillation frequency corresponding to an object on which the ultrasonic oscillators 29 and 32 are mounted. In addition, if the dust shaken off by ultrasonic oscillation by the ultrasonic oscillator scatters, a catching member such as the adhesion sheet as described in the first embodiment can be arranged at a lower portion so that the dust shaken off adheres thereto. Furthermore, if a negative effect of ultrasonic oscillation of a mounted ultrasonic oscillator to other optical parts is concerned, the ultrasonic oscillator can be mounted through a buffer material such as rubber that attenuates the ultrasonic oscillation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
   a first optical member;
   a movable member that moves so as to pass near the first optical member at a time of an observation operation of the microscope, wherein the movable member comprises a turret into which a plurality of second optical members are insertable; and
   at least one dust removing member that is mounted on the movable member, and that removes dust adhered on a surface of the first optical member when the movable member moves.

2. The microscope according to claim 1, wherein the dust removing member comprises a soft material that touches a surface of the first optical member when the movable member moves.

3. The microscope according to claim 2, wherein the dust removing member comprises a brush formed of the soft material.

4. The microscope according to claim 1, wherein the dust removing member comprises a member that electrostatically absorbs and removes dust adhered on the surface of the first optical member, while passing near the first optical member when the movable member moves.

5. The microscope according to claim 1, wherein the dust removing member is detachable from the movable member.

6. The microscope according to claim 1, wherein the second optical member comprises a phase ring.

7. The microscope according to claim 6, wherein the mounting comprises mounting a plurality of dust removing members so as to be radially attached to the movable member at positions such that optical paths of the second optical members are not disturbed.

8. The microscope according to claim 1, wherein the at least one dust removing member comprises a plurality of dust removing members radially attached to the movable member at positions such that optical paths of the second optical members are not disturbed.

9. A dust treatment method for a microscope comprising:
   mounting at least one dust removing member on a movable member that moves so as to pass near a first optical member at a time of an observation operation of the microscope, wherein the movable member comprises a turret into which a plurality of second optical members are insertable; and
   removing dust adhered on a surface of the first optical member by the dust removing member mounted on the movable member when the movable member moves.

* * * * *